(12) United States Patent
Rubira Branco et al.

(10) Patent No.: US 9,880,947 B2
(45) Date of Patent: Jan. 30, 2018

(54) RETURN ORIENTED PROGRAMMING STACK PIVOTING PROTECTION

(71) Applicant: Intel Corporation, Santa Clara, CA (US)

(72) Inventors: Rodrigo Rubira Branco, Hillsboro, OR (US); Xiaoning Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 14/667,125

(22) Filed: Mar. 24, 2015

(65) Prior Publication Data

US 2016/0283410 A1   Sep. 29, 2016

(51) Int. Cl.
*G06F 12/14*   (2006.01)
*G06F 21/52*   (2013.01)

(52) U.S. Cl.
CPC .......... *G06F 12/1458* (2013.01); *G06F 21/52* (2013.01); *G06F 2212/1052* (2013.01)

(58) Field of Classification Search
CPC .................................................. G06F 12/1458
See application file for complete search history.

(56) References Cited

U.S. PATENT DOCUMENTS

| | | | | |
|---|---|---|---|---|
| 9,223,979 B2* | 12/2015 | Fischer | ................. | G06F 21/566 |
| 2016/0092673 A1* | 3/2016 | LeMay | ................... | G06F 21/56 |
| | | | | 718/1 |
| 2016/0094552 A1* | 3/2016 | Durham | ................. | G06F 21/52 |
| | | | | 713/171 |

OTHER PUBLICATIONS

Jared Demott, "Bypassing EMET 4.1," Bromium Labs, Feb. 2014, 19 pages, <https://bromiumlabs.files.wordpress.com/2014/02/bypassing-emet-4-1.pdf>.

* cited by examiner

*Primary Examiner* — Oleg Korsak
*Assistant Examiner* — Simon Kanaan
(74) *Attorney, Agent, or Firm* — Jordan IP Law, LLC

(57) ABSTRACT

Systems, apparatuses and methods may provide for identifying a stack pointer associated with a sequence of code being executed on a computing system and counting a number of exchange updates to the stack pointer. Additionally, a hardware interrupt may be generated if the number of exchange updates reaches a threshold. In one example, the hardware interrupt is a performance monitoring interrupt.

20 Claims, 4 Drawing Sheets

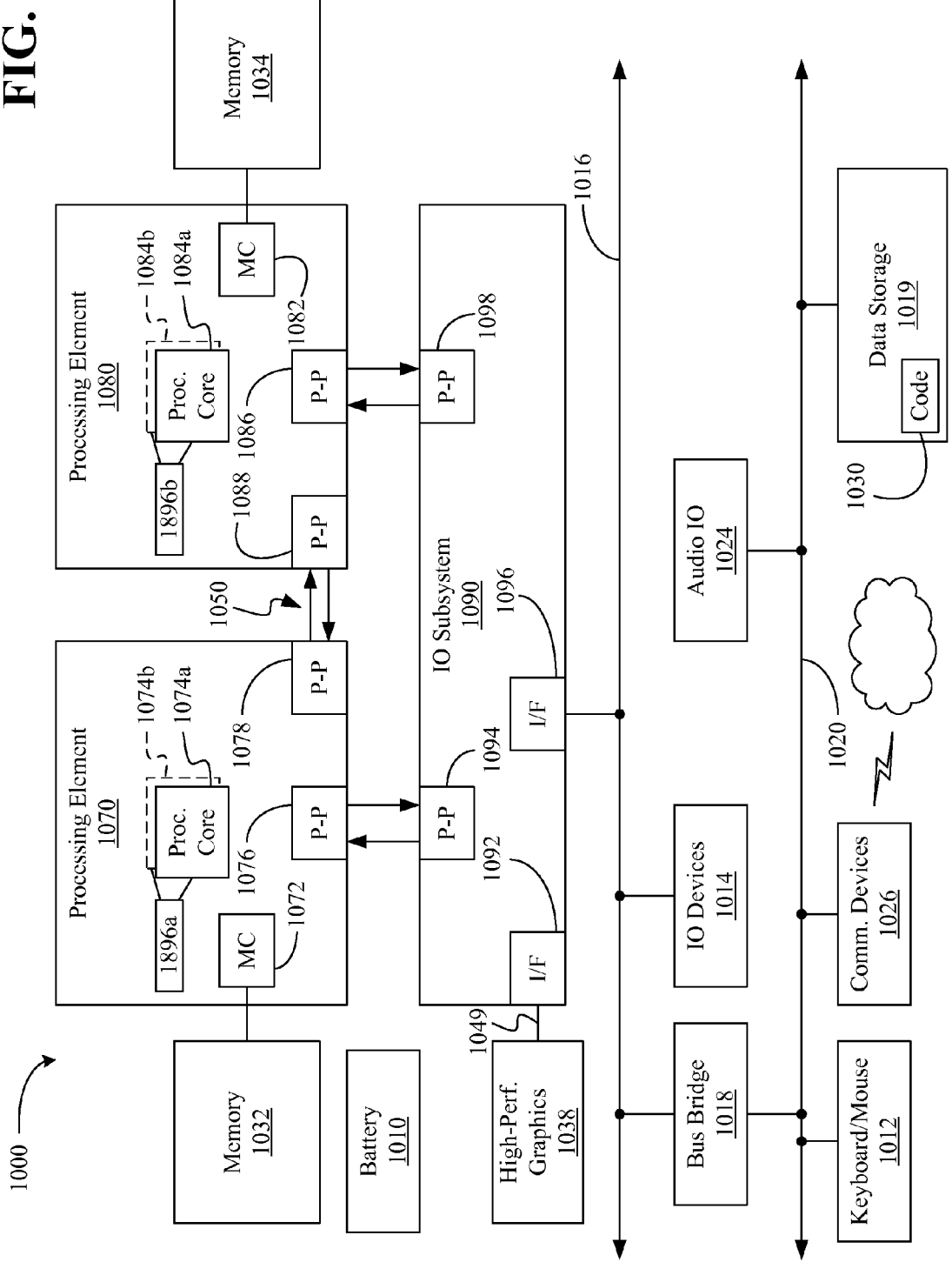

RETURN ORIENTED PROGRAMMING STACK PIVOTING PROTECTION

TECHNICAL FIELD

Embodiments generally relate to data security. More particularly, embodiments relate to return oriented programming (ROP) stack pivoting protection.

BACKGROUND

In computing systems, a stack may be a last-in-first-out memory structure used to store temporary variables created by functions in software being executed. The stack may also store information on where to return once a function call is issued, wherein a stack pointer may store the address of the last function variable added to the top of the stack. Return oriented programming (ROP) is a technique that may be used to exploit software vulnerability in which the attacker forces out-of-order execution of currently existing code fragments (e.g., gadgets) to perform unexpected/arbitrary computations. More particularly, the attacker may manipulate the stack information indicating where to return in an effort to control the execution flow (thus, the return oriented programming name).

For example, the attacker may make an exchange update to the stack pointer in order to "pivot" the stack into another memory area (e.g., the heap) that is under the control of the attacker. Thus, grouping together different gadgets in the other memory area may enable the attacker to perform the final malicious computation(s). Conventional approaches to ROP stack pivoting protection may attempt to intercept function calls that are commonly used to create the other memory area. Such a solution, however, may be bypassed (e.g., by avoiding the use of certain function calls) and/or may have a negative impact on performance (e.g., due to instrumentation of every loaded code/library).

BRIEF DESCRIPTION OF THE DRAWINGS

The various advantages of the embodiments will become apparent to one skilled in the art by reading the following specification and appended claims, and by referencing the following drawings, in which:

FIG. 5 is a block diagram of an example of a computing system according to an embodiment.

DESCRIPTION OF EMBODIMENTS

Figure 1:
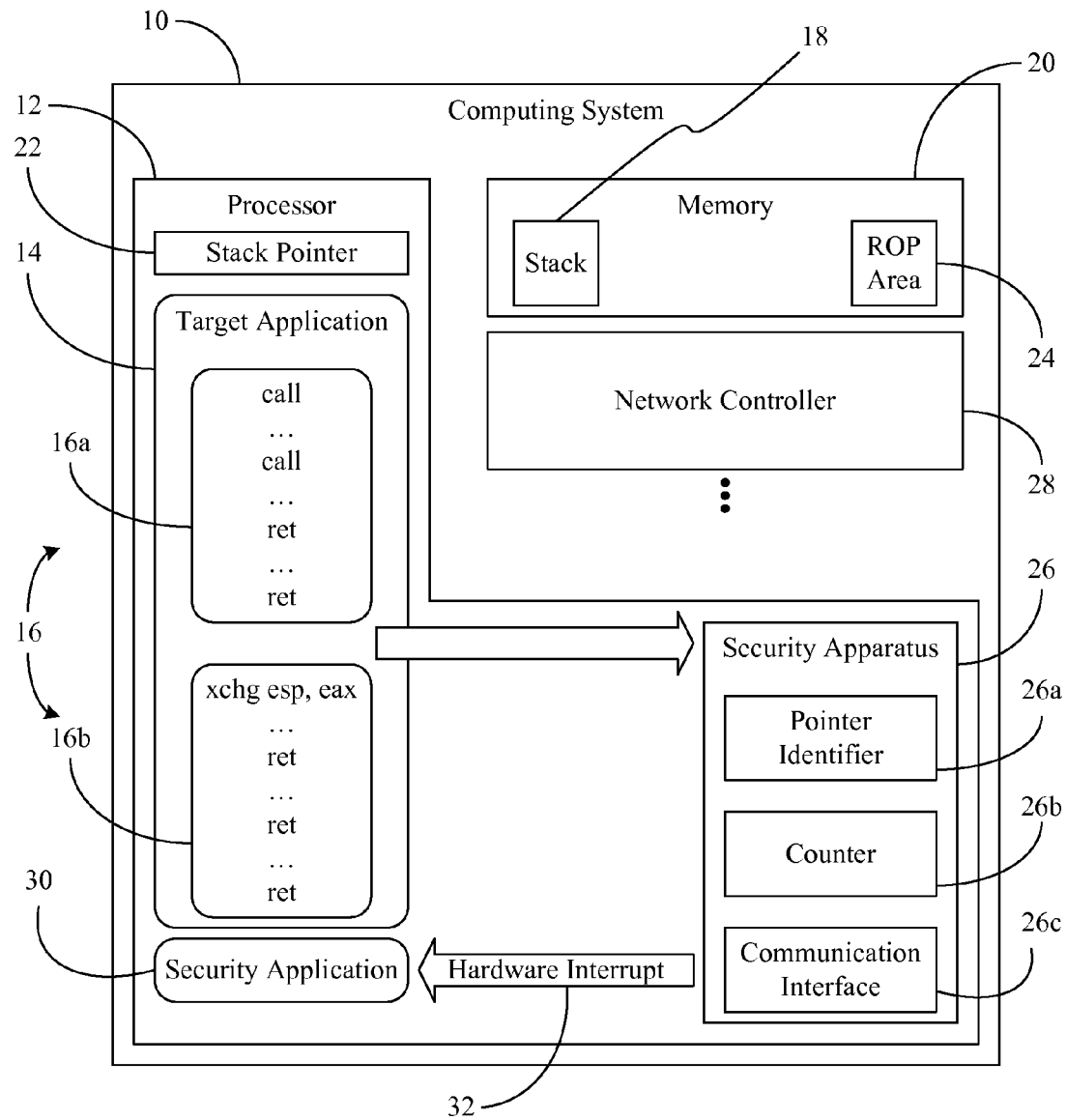
FIG. 1 is a block diagram of an example of a computing system having a security apparatus according to an embodiment.

Turning now to FIG. 1, a computing system 10 is shown. The computing system 10 may include, for example, a server, desktop computer, notebook computer, tablet computer, convertible tablet, personal digital assistant (PDA), mobile Internet device (MID), smart phone, wearable computer, media player, etc., or any combination thereof. Thus, the computing system 10 may include a network controller 28. In the illustrated example, a processor 12 (e.g., host processor, graphics processor) generally executes a target application 14 (e.g., targeted by an attacker) that contains a sequence of code 16 (16a, 16b; e.g., thread). During execution of a first portion 16a of the sequence of code 16, a stack 18 (e.g., buffer) located in a memory 20 of the computing system 10 may be used to store temporary variables created by functions (e.g., "call", "ret") in the target application 14, wherein a stack pointer 22 (e.g., register) may store the address of the last function variable added to the top of the stack 18.

An attacker having access to the computing system 10 via may create, however, a return oriented programming (ROP) area 24 in which currently existing code fragments (e.g., gadgets) are grouped out-of-order in an effort to perform unexpected, arbitrary and/or malicious computations. In such a case, a second portion 16b of the sequence of code 16 may contain an exchange update that attempts to pivot the stack pointer 22 from the stack 18 to the ROP area 24. For example, the illustrated exchange update includes an exchange (e.g., "xchg") of the extended stack pointer (e.g., "esp") to a new memory location (e.g., "eax"), wherein the new memory location corresponds to the ROP area 24. To protect against the attempted stack pivot, the illustrated processor 12 includes a security apparatus 26 (26a-26c; e.g., ROP detection hardware) to detect the stack pivot and report the stack pivot to a security application 30 (e.g., antivirus software). The security application 30 may in turn determine whether the stack pivot is unauthorized. The security application 30 may run on the processor 12 (as shown), elsewhere in the computing system 10 and/or remotely from the computing system.

More particularly, the illustrated security apparatus 26 includes a pointer identifier 26a to identify the stack pointer 22 associated with the sequence of code 16 being executed on the computing system 10 and a counter 26b to count the number of exchange updates to the stack pointer 22. The counter 26b may be a hardware counter residing n a portion of the security apparatus 26 that is generally responsible for performance monitoring (e.g., having other hardware counters such as return mispredict counters, call mispredict counters, number of returns counters, number of calls counters, and so forth). The security apparatus 26 may also include a communication interface 26c to generate a hardware interrupt 32 if the number of exchange updates reaches a threshold. The threshold may be one in order to notify the security application 30 every time an exchange update takes place.

Alternatively, the threshold may be greater than one in situations where the security application 30 is notified not on the pivoting to the ROP area 24, but on the way back to the correct stack 18. Such an approach may have performance benefits (e.g., because at each interruption, there may be a need for deeper inspection to avoid false positives), with a potential drawback of permitting the ROP attack to take place. The hardware interrupt 32 may be a performance monitoring interrupt that indicates the address of the ROP area 24 (e.g., the "eax" stack pivot location). The illustrated solution may therefore provide protection against unauthorized stack pivots without having a negative impact on performance. Additionally, the illustrated solution is not dependent on the detection of many types of function calls and may be more difficult to bypass than conventional solutions.

Figure 2:
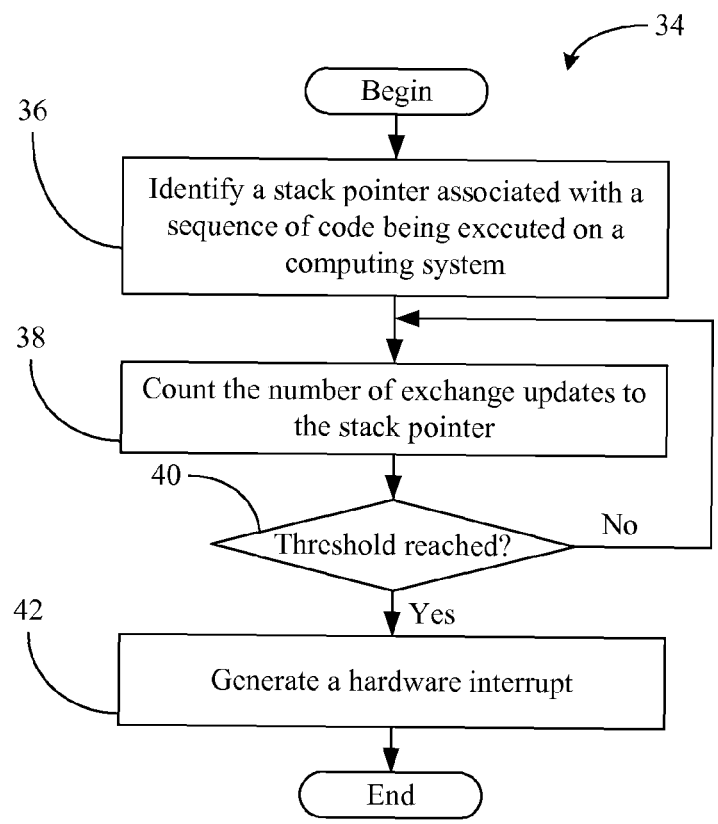
FIG. 2 is a flowchart of an example of a method of operating a security apparatus according to an embodiment.

FIG. 2 shows a method 34 of operating a security apparatus. The method 34 may generally be implemented in a security apparatus such as, for example, the security apparatus 26 (FIG. 1), already discussed. More particularly, the method 34 may be implemented as a module or related component in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 36 provides for identifying a stack pointer associated with a sequence of code being executed on a computing system, wherein the number of exchange updates to the stack pointer may be counted at block 38. A determination may be made at block 40 as to whether the number of exchange updates has reached a particular threshold (e.g., one, greater than one). If not, the illustrated method 34 continues to count the number of exchange updates. Otherwise, block 42 may generate a hardware interrupt 42 such as, for example, a performance monitoring interrupt. The counter may be reset as appropriate, depending on the circumstances.

Figure 3:
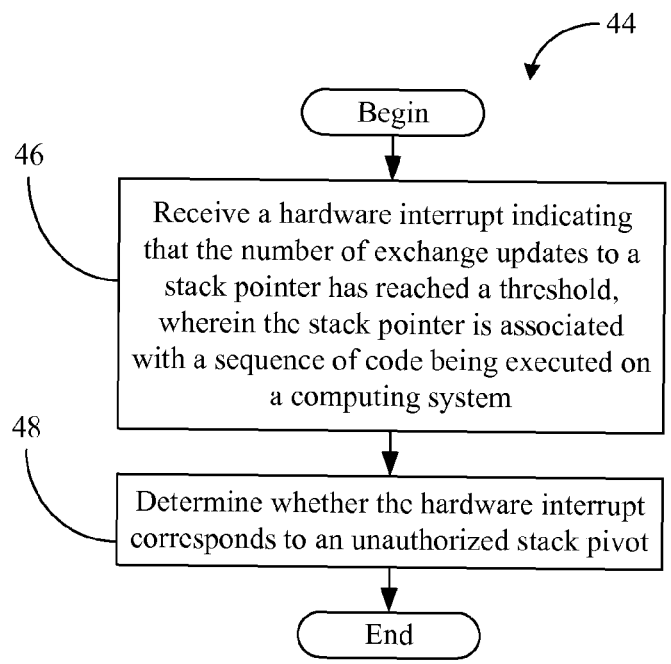
FIG. 3 is a flowchart of an example of a method of operating a security application according to an embodiment.

Turning now to FIG. 3, a method 44 of operating a security application is shown. The method 44, may generally be implemented in a security application such as, for example, the security application 30 (FIG. 1), already discussed. More particularly, the method 44 may be implemented as a module or related component in a set of logic instructions stored in a machine- or computer-readable storage medium such as random access memory (RAM), read only memory (ROM), programmable ROM (PROM), firmware, flash memory, etc. For example, computer program code to carry out operations shown in the method 44 may be written in any combination of one or more programming languages, including an object oriented programming language such as JAVA, SMALLTALK, C++ or the like and conventional procedural programming languages, such as the "C" programming language or similar programming languages.

Illustrated processing block 46 provides for receiving (e.g., from a hardware counter) a hardware interrupt indicating that the number of exchange updates to a stack pointer has reached a threshold, wherein the stack pointer is associated with a sequence of code being executed on a computing system. Block 48 may determine whether the hardware interrupt corresponds to an unauthorized stack pivot. In one example, block 48 includes determining a stack pivot location based on the hardware interrupt and using the stack pivot location to determine whether an unauthorized stack pivot has taken place.

Figure 4:
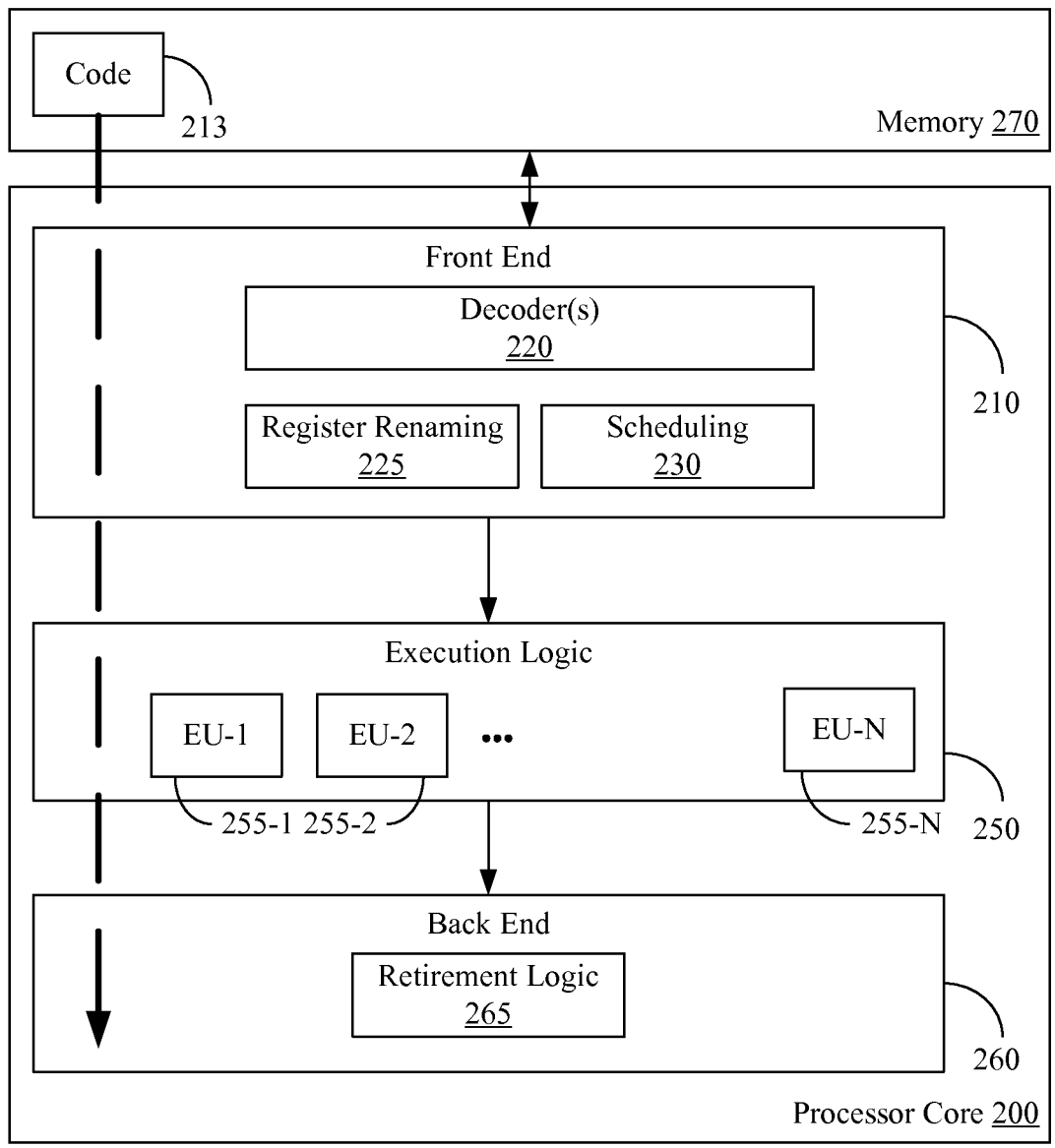
FIG. 4 is a block diagram of an example of a processor according to an embodiment.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 44 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 5, shown is a block diagram of a computing system 1000 embodiment in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 4.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 44 (FIG. 3), already discussed, and may be similar to the code 213 (FIG. 4), already discussed. Additionally, the computing system 1000 may include a security apparatus (not shown) such as, for example, the security apparatus 26 (FIG. 1), already discussed. Further, an audio I/O 1024 may be coupled to second bus 1020 and a battery 1010 may supply power to the computing system 1000.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

ADDITIONAL NOTES & EXAMPLES

Example 1 may include a return oriented programming vulnerable computing system comprising a security apparatus comprising a pointer identifier to identify a stack pointer associated with a sequence of code being executed on the computing system, a counter to count a number of exchange updates to the stack pointer, and a communication interface to generate a hardware interrupt if the number of exchange updates reaches a threshold. The computing system may also comprise at least one computer readable storage medium comprising a set of security instructions, which when executed by the computing system, cause the computing system to receive the hardware interrupt and determine whether the hardware interrupt corresponds to an unauthorized stack pivot.

Example 2 may include the computing system of Example 1, wherein the hardware interrupt is to be a performance monitoring interrupt.

Example 3 may include the computing system of Example 1, wherein the threshold is to be one.

Example 4 may include the computing system of Example 1, wherein the threshold is to be greater than one.

Example 5 may include the computing system of Example 1, wherein the hardware interrupt is to indicate a stack pivot location.

Example 6 may include the computing system of any one of Examples 1 to 5, wherein the counter is a hardware counter.

Example 7 may include a security apparatus comprising a pointer identifier to identify a stack pointer associated with a sequence of code being executed on a computing system, a counter to count a number of exchange updates to the stack pointer, and a communication interface to generate a hardware interrupt if the number of exchange updates reaches a threshold.

Example 8 may include the apparatus of Example 7, wherein the hardware interrupt is to be a performance monitoring interrupt.

Example 9 may include the apparatus of Example 7, wherein the threshold is to be one.

Example 10 may include the apparatus of Example 7, wherein the threshold is to be greater than one.

Example 11 may include the apparatus of Example 7, wherein the hardware interrupt is to indicate a stack pivot location.

Example 12 may include the apparatus of any one of Examples 7 to 11, wherein the counter is a hardware counter.

Example 13 may include a method of operating a security apparatus, comprising identifying a stack pointer associated with a sequence of code being executed on a computing system, counting a number of exchange updates to the stack pointer, and generating a hardware interrupt if the number of exchange updates reaches a threshold.

Example 14 may include the method of Example 13, wherein the hardware interrupt is a performance monitoring interrupt.

Example 15 may include the method of Example 13, wherein the threshold is one.

Example 16 may include the method of Example 13, wherein the threshold is greater than one.

Example 17 may include the method of Example 13, wherein the hardware interrupt indicates a stack pivot location.

Example 18 may include the method of any one of Examples 13 to 17, wherein the number of exchange updates is counted with a hardware counter.

Example 19 may include at least one computer readable storage medium comprising a set of instructions, which when executed by a computing system, cause the computing system to receive a hardware interrupt indicating that a number of exchange updates to a stack pointer has reached a threshold, wherein the stack pointer is to be associated with a sequence of code being executed on the computing system, and determine whether the hardware interrupt corresponds to an unauthorized stack pivot.

Example 20 may include the at least one computer readable storage medium of Example 19, wherein the hardware interrupt is to be a performance monitoring interrupt.

Example 21 may include the at least one computer readable storage medium of Example 19, wherein the threshold is to be one.

Example 22 may include the at least one computer readable storage medium of Example 19, wherein the threshold is to be greater than one.

Example 23 may include the at least one computer readable storage medium of Example 19, wherein the instructions, when executed, causes the computing system to determine a stack pivot location based on the hardware interrupt.

Example 24 may include the at least one computer readable storage medium of any one of Examples 19 to 23, wherein the hardware interrupt is to be received from a hardware counter.

Example 25 may include a security apparatus comprising means for identifying a stack pointer associated with a sequence of code being executed on a computing system, means for counting a number of exchange updates to the stack pointer, and means for generating a hardware interrupt if the number of exchange updates reaches a threshold.

Example 26 may include the apparatus of Example 25, wherein the hardware interrupt is to be a performance monitoring interrupt.

Example 27 may include the apparatus of Example 25, wherein the threshold is to be one.

Example 28 may include the apparatus of Example 25, wherein the threshold is to be greater than one.

Example 29 may include the apparatus of Example 25, wherein the hardware interrupt is to indicate a stack pivot location.

Example 30 may include the apparatus of any one of Examples 25 to 19, wherein the means for counting includes a hardware counter.

Thus, techniques described herein may be simpler than adding processor checks for returns that are not in the stack segment and may protect against all stack pivoting vulnerabilities (e.g., rather than a small subset of them). Techniques may also obviate any need for re-compilation of code or compiler modification as in solutions that use init/terminator instructions to provide protection.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a security apparatus comprising,
   a pointer identifier to identify a stack pointer associated with a sequence of code being executed on the computing system,
   a counter to count a number of exchange updates to the stack pointer, and
   a communication interface to generate a hardware interrupt if the number of exchange updates reaches a threshold, wherein the hardware interrupt is to indicate a stack pivot location; and
   at least one computer readable storage medium comprising a set of security instructions, which when executed by the computing system, cause the computing system to,
   receive the hardware interrupt,
   determine the stack pivot location based on the hardware interrupt, and
   determine whether the hardware interrupt corresponds to an unauthorized stack pivot using the stack pivot location determined from the hardware interrupt.

2. The computing system of claim 1, wherein the hardware interrupt is to be a performance monitoring interrupt.

3. The computing system of claim 1, wherein the threshold is to be one.

4. The computing system of claim 1, wherein the threshold is to be greater than one.

5. The computing system of claim 1, wherein the counter is a hardware counter.

6. An apparatus comprising:
   a pointer identifier to identify a stack pointer associated with a sequence of code being executed on a computing system;
   a counter to count a number of exchange updates to the stack pointer; and
   a communication interface to generate a hardware interrupt if the number of exchange updates reaches a threshold, wherein the hardware interrupt is to indicate a stack pivot location to be used to determine whether an unauthorized stack pivot has occurred.

7. The apparatus of claim 6, wherein the hardware interrupt is to be a performance monitoring interrupt.

8. The apparatus of claim 6, wherein the threshold is to be one.

9. The apparatus of claim 6, wherein the threshold is to be greater than one.

10. The apparatus of claim 6, wherein the counter is a hardware counter.

11. A method comprising:
    identifying a stack pointer associated with a sequence of code being executed on a computing system;
    counting a number of exchange updates to the stack pointer;
    generating a hardware interrupt if the number of exchange updates reaches a threshold, the hardware interrupt indicating a stack pivot location;
    determining the stack pivot location based on the hardware interrupt; and
    determining whether the hardware interrupt corresponds to an unauthorized stack pivot using the stack pivot location determined from the hardware interrupt.

12. The method of claim 11, wherein the hardware interrupt is a performance monitoring interrupt.

13. The method of claim 11, wherein the threshold is one.

14. The method of claim 11, wherein the threshold is greater than one.

15. The method of claim 11, wherein the number of exchange updates is counted with a hardware counter.

16. At least one non-transitory computer readable storage medium comprising a set of instructions, which when executed by a computing system, cause the computing system to:
    receive a hardware interrupt indicating that a number of exchange updates to a stack pointer has reached a threshold, wherein the stack pointer is to be associated with a sequence of code being executed on the computing system;
    determine a stack pivot location based on the hardware interrupt; and
    determine whether the hardware interrupt corresponds to an unauthorized stack pivot using the stack pivot location determined from the hardware interrupt.

17. The at least one non-transitory computer readable storage medium of claim 16, wherein the hardware interrupt is to be a performance monitoring interrupt.

18. The at least one non-transitory computer readable storage medium of claim 16, wherein the threshold is to be one.

19. The at least one non-transitory computer readable storage medium of claim 16, wherein the threshold is to be greater than one.

20. The at least one non-transitory computer readable storage medium of claim 16, wherein the hardware interrupt is to be received from a hardware counter.

* * * * *